United States Patent [19]

Piacente et al.

[11] 3,749,847

[45] July 31, 1973

[54] DEVICE FOR BLOCKING TOLL CALLS FROM SUBSCRIBER TELEPHONES

[75] Inventors: Luigi Piacente, Milan; Giovanni Gandolfi, Cesano Maderno, both of Italy

[73] Assignee: Societa Italiana Telecomunicazioni Siemens S.p.A., Milan, Italy

[22] Filed: Oct. 5, 1971

[21] Appl. No.: 186,692

[30] Foreign Application Priority Data

Oct. 6, 1970 Italy ............................ 30637 A/70

[52] U.S. Cl. ................................................ 179/90 D

[51] Int. Cl. ............................................ H04m 3/38

[58] Field of Search ............ 179/90 D, 90 R, 18 DA

[56] References Cited

UNITED STATES PATENTS

| | | | |
|---|---|---|---|
| 3,569,634 | 7/1972 | Maj et al. | 179/18 DA |
| 3,553,382 | 7/1972 | Knox et al. | 179/18 DA |
| 1,649,494 | 7/1972 | Smith | 179/18 DA |

*Primary Examiner*—Kathleen H. Claffy
*Assistant Examiner*—Kenneth Richardson
*Attorney*—Karl F. Ross

[57] ABSTRACT

To prevent the unauthorized initiation of toll calls from a subscriber station of a telephone system, the telephone set is equipped with monitoring circuitry working into a binary/decimal counter which is activated during the dialing of the first (or some other specified) digit and, in response to one or more predetermined values of that digit, trips a flip-flop to place a shunt across the line loop with concurrent generation of a busy signal. The flip-flop is also tripped if dialing is commenced before reception of a dial tone from the central office. To prevent the generation of a spurious dial tone by voice frequencies, the microphone of the telephone receiver is short-circuited during dialing. The monitoring device, which can be manually switched off by an authorized operator, is continuously energized by the voltage drop developed across a shunt network in a quiescent state and across a series network in an active state.

10 Claims, 4 Drawing Figures

Luigi Piacente
Giovanni Gandolfi
INVENTORS.

BY

Karl F. Ross
Attorney

Luigi Piacente
Giovanni Gandolfi
INVENTORS.

BY

Karl F. Ross
Attorney

DEVICE FOR BLOCKING TOLL CALLS FROM SUBSCRIBER TELEPHONES

Our present invention relates to a device for blocking the initiation of certain outgoing calls, such as toll calls, from a subscriber station of a telecommunication system.

The automation of telephony enables the initiation of toll calls from a subscriber station without the intervention of a central-office operator. In many instances, however, such toll calls are not permitted to other than specially authorized persons; pay stations, for example, are often restricted to local calls.

The general object of our invention is to provide a foolproof and tamperproof device for preventing the initiation of toll calls (or, in an extreme case, of any outgoing calls) from a station accessible to persons not authorized to make such calls.

A more specific object is to provide a purely electronic system, without wear-prone movable parts, which can be selectively adapted to inhibit any type of outgoing call characterized by a predetermined numerical value of either the first digit or some other specified digit of a call number.

In the United States, toll calls are generally initiated by the dialing of an area code containing a 0 or a 1 as its second digit. In some localities, this area code is preceded by an initial digit 1. In other countries, long-distance calls require the initial dialing of a 0.

Thus, a device embodying our invention comprises essentially an electronic pulse counter in combination with monitoring circuitry connected across a subscriber line for detecting dial pulses generated by periodic opening and closing of a line loop, this circuitry including pulse-shaping means for producing trains of stepping pulses in the rhythm of the dial pulses and for deriving from each pulse train an individual digital pulse which enables the counter, through the intermediary of a control circuit responsive to these digital pulses, to receive the stepping pulses pertaining to a particular digit. If this digit has a predetermined numerical value, or one of several such values (e.g. 0 or 1 ), the output lead of the counter trips an electronic switch such as a flip-flop to place a shunt across the dial or other call selector at the subscriber station so as to prevent effective open-circuiting of the line loop and to attenuate the dial pulses transmitted over the line to the central office.

Experience has shown that prior attempts at policing outgoing calls with the aid of a pulse counter are sometimes frustrated by manipulating the selector and the hook switch of the telephone set in a manner avoiding the reception of a dial tone from the central office or exchange before the first pulse is dialed, thereby aborting the operation of a call inhibitor normally alerted by such dial tone. In accordance with a further feature of our invention, therefore, we provide an alternating-current detector whose output is fed, together with the stepping pulses from the pulse shaper, to a discriminator which trips the dial-shunting switch independently of the counter if no dial tone is present prior to the generation of the first stepping pulse.

Even so, voice frequencies reaching the line over an electro-acoustic transducer, such as the microphone of a telephone receiver, could be picked up by the a-c detector and cause a malfunction of the discriminator. For this reason, still another feature of our invention resides in the provision of a disabling circuit for the transducer effective under the control of the pulse shaper in the presence of stepping pulses, the transducer being reactivated by the a-c detector in the presence of switching signals (dial tone, busy signal or ringing current) from the central office.

Yet another important feature of our invention resides in the provision of a continuously operative low-drain power supply, fed from the central office, for energizing the monitoring circuitry and other active components of the device to keep them in a state of readiness.

The invention will be described in greater detail hereinafter with reference to the accompanying drawing in which.

Figure 1:
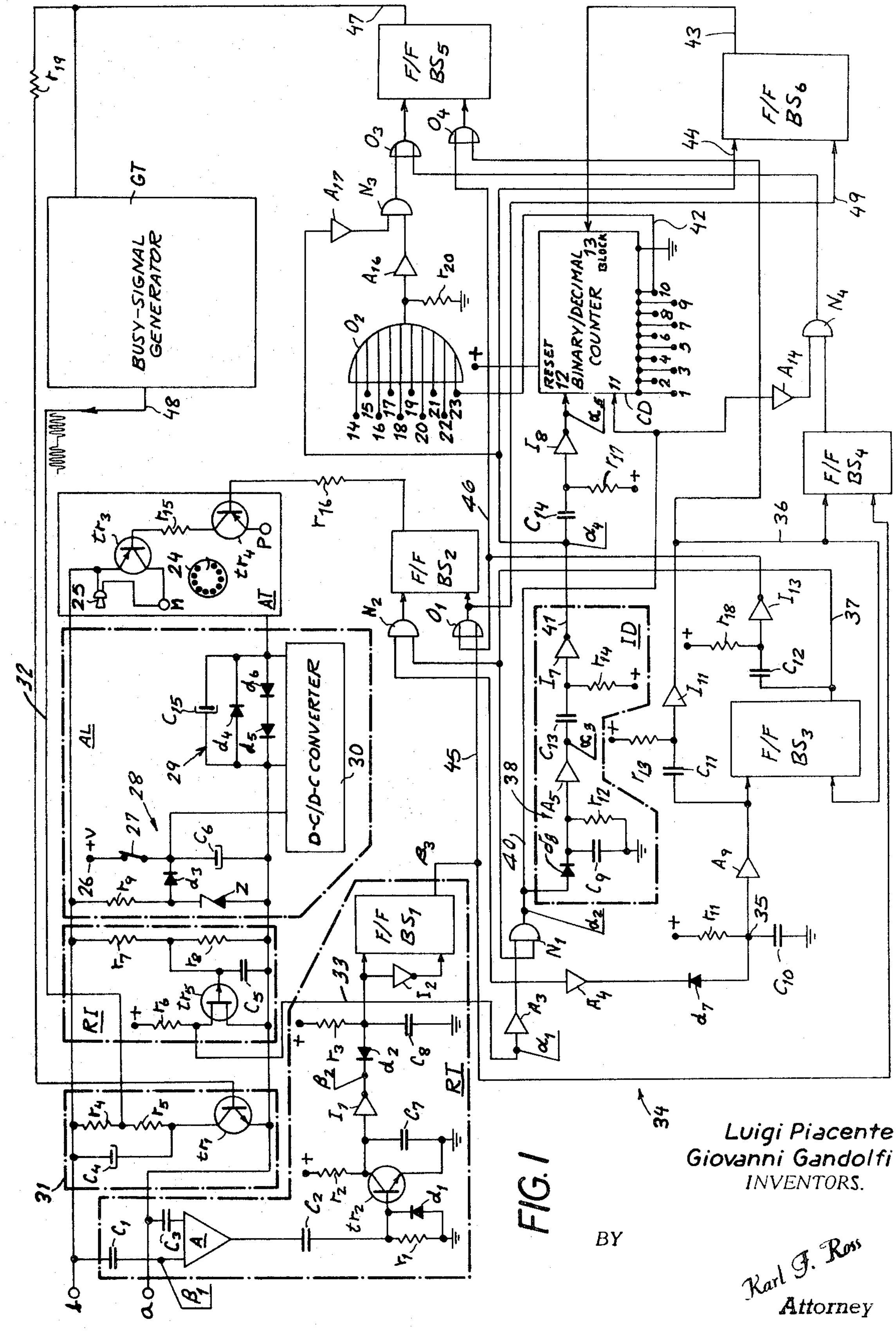
FIG. 1 is an overall circuit diagram of a representative embodiment.

The system shown in FIG. 1 comprises a subscriber station, including a telephone handset AT, connected via a two-wire line *a*, *b* to a remote central office. The set AT is conventionally equipped with a dial 24 and a microphone 25, an earpiece (not shown) and a nonillustrated hook switch for closing a line loop by interconnecting conductors a and b through a set of dial-operated contacts upon a lifting of the receiver.

Wires *a*, *b* are continuously energized from the central office with d-c voltage (assumed to be relativey positive for wire *b*) which is picked up in a power-supply circuit AL provided with an output terminal 26; a positive voltage +V normally appearing on this terminal is communicated to various ungrounded terminals throughout the system which have been designated by + signs. All these terminals can be disconnected from power by means of a normally closed circuit breaker 27 which can be opened, it is assumed, only with the aid of a special key available to authorized persons.

Power supply AL comprises a first network 28, shunted across the line *a*, *b* in parallel with the apparatus AT, and a second network 29 in series with conductor *a* thereof. Network 28 comprises a resistor $r_9$ in series with a Zener diode Z, this diode being shunted by the series combination of an ordinary diode $d_3$ and a capacitor $C_6$ whose junction is connected via circuit breaker 27 to terminal 26. This junction is also tied to the output of a d-c/d-c converter 30 having its input connected across network 29, the latter comprising three parallel branches constituted by a capacitor $C_{15}$, a diode $d_4$ connected with blocking polarity, and a low resistance represented by two diodes $d_5$, $d_6$ serially connected in the forward direction.

In the quiescent state, with the line loop open, terminal 26 is energized by the voltage drop developed across Zener diode Z. In the active state, with the line loop closed, this voltage drop is sharply reduced but the output of converter 30 establishes a similar voltage drop across condenser $C_6$ whose capacitance holds the voltage +V substantially constant during short interruptions of the line loop in the course of dialing.

Another network 31, bridged across the line, comprises a transistor $tr_1$ in series with two resistors $r_4$, $r_5$ which are shunted by a capacitor $C_4$. The base of transistor $tr_1$ is connected to a lead 32 which is normally held at a negative potential so that the shunt impedance of network 31 is high.

A further network RI, acting as a pulse regenerator, or shaper, comprises a voltage divider $r_7$, $r_8$ connected across wires *a*, *b*, a capacitor $C_5$ in parallel with resistor $r_8$, and a field-effect transistor $tr_5$ having its source connected to potential through a resistor $r_6$ and having its gate-drain circuit connected across the parallel combination of resistor $r_8$ and capacitor $C_5$. A lead 33 extends from the source electrode of this transistor to an identication network ID forming part, together with network RI, of a monitoring circuit 34 also including a binary/-decimal counter CD. An input amplifier $A_3$ of circuit 34, tied to lead 33, works in parallel into a pair of AND gates $N_1$, $N_2$ and a further amplifier $A_4$, the output of the latter being delivered via a reverse connected diode $d_7$ to a junction 35 of a grounded capacitor $C_{10}$ and a clamping resistor $r_{11}$ connected to potential. Junction 35 is connected through another amplifier $A_9$ to a resetting input of a bistable circuit or flip-flop $BS_3$ and, in parallel therewith, to a differentiation circuit comprising a condenser $C_{11}$ and a resistor $r_{13}$ whose junction is returned through an inverter $I_{11}$ to the setting input of this flip-flop by way of a lead 36. The set output of flip-flop $BS_3$ feeds the other inputs of AND gates $N_1$ and $N_2$ through a lead 37.

Identification circuit ID comprises an integrating stage 38, terminating in an amplifier $A_5$, in cascade with a differentiation stage -1 39 terminating in an inverter $I_7$. Stage 38 includes a capacitor $C_9$ in parallel with a resistor $r_{12}$, both fed through a diode $d_8$ from an output lead 40 of AND gate $N_1$; stage 39 comprises a condenser $C_{13}$ whose junction with inverter $I_7$ is tied to potential through a positively biased clamping resistor $r_{14}$ . The output lead 41 of inverter $I_7$ is connected to a zeroizing input 12 of counter CD through a delay network (in the form of a further differentiation circuit) comprising a condenser $C_{14}$ and a clamping resistor $r_{17}$, with interposition of an inverter $I_8$ between that network and the counter. Lead 40 terminates at a stepping input 11 of counter CD which is shown to have ten output leads labeled 1 – 10. The internal connections of the counter are such that, as is well known per se, registration of any number of stepping pulses, from one to ten, electrically marks (i.e. drives positive) the corresponding output lead 1 . . . 10. One or more of these output leads may be selectively joined to respective input leads 14 – 23 of an OR gate $O_2$, as particularly illustrated at 42 for the counter output 10 and the gate input 23. Counter CD also has a blocking input 13 which is tied to a set output 43 of another flip-flop $BS_6$ controlled by the identification circuit ID via a lead 44 extending from the output lead 41 of that circuit to the setting input of the flip-flop.

A dial-tone detector RT comprises a clipping amplifier A connected across line *a*, *b* via condensers $C_1$ $C_3$ which block the direct-current signals. Amplifier A, converting sinusoidal audio-frequency waves into substantially rectangular pulses, works into the base of a transistor $tr_2$ by way of a unipolar differentiator comprising a capacitor $C_2$ and a grounded resistor $r_1$ shunted by a diode $d_1$. Transistor $tr_2$, whose collector is connected to potential through a resistor $r_2$ and to ground through a condenser $C_7$, delivers its output through an inverter $I_1$ and a reverse-connected diode $d_2$ to an integrating circuit comprising a grounded capacitor $C_8$ and a clamping resistor $r_3$. The junction of this capacitor and resistor is tied directly to a resetting input and through an inverter $I_2$ to a setting input of a flip-flop $BS_1$ whose set output feeds a lead 45 terminating at an OR gate $O_1$ and, in parallel therewith, at a resetting input of another flip-flop $BS_4$ whose setting input is tied to lead 36 in parallel with the setting input of flip-flop $BS_3$. The set output of the latter flip-flop is jointed to a lead 46 through a unipolar differentiation circuit comprising a clamping resistor $r_{18}$ and a condenser $C_{12}$ in series with an inverter $I_{13}$, lead 46 terminating at another input of OR gate $O_1$ and in parallel therewith at an OR gate $O_4$ having a second input tied to lead 36.

An AND gate $N_4$, with inputs connected to the set output of flip-flop $BS_4$ and through an amplifier $A_4$ to lead 40, works into one input of an OR gate $0_3$ whose other input is energizable from the output of OR gate $O_2$, developed across a resistor $r_{20}$, via an amplifier $A_{16}$ and an AND gate $N_3$ in cascade; the second input of gate $N_3$ is connected to lead 41 via an amplifier $A_{17}$. OR gates $0_3$ and $0_4$ deliver their outputs to a setting input and a resetting input, respectively, of a flip-flop $BS_5$ whose set output 47, when energized, triggers a busy-signal generator GT having an output lead 48 extended to the junction of resistors $r_4$ and $r_5$ in circuit 31. Output 47 is also connected, through a resistor $r_{19}$, to lead 32 which is driven positive when the flip-flop $BS_5$ is set, thereby saturating the transistor $tr_1$ and placing a low-impedance shunt across the line *a*, *b*.

OR gate $O_1$ has an output lead 49 which works into a resetting input of flip-flop $BS_6$ and, in parallel therewith, into a similar input of a further flip-flop $BS_2$ which is settable by the output of AND gate $N_2$. The set output of flip-flop $BS_2$ is extended through a resistor $r_{16}$ to the base of a transistor $tr_4$ in telephone set AT, transistor $tr_4$ being cascaded via a resistor $r_{15}$ with a further transistor $tr_3$ bridging the microphone 25. The collector of transistor $tr_3$ and the emitter of transistor $tr_4$, both of which are of the PNP type in contrast to all the other transistors, are connected through respective terminals M and P on the telephone set to sources of biasing voltage so chosen that transistor $tr_3$ conducts only when flip-flop $BS_2$ is set.

Figure 2:
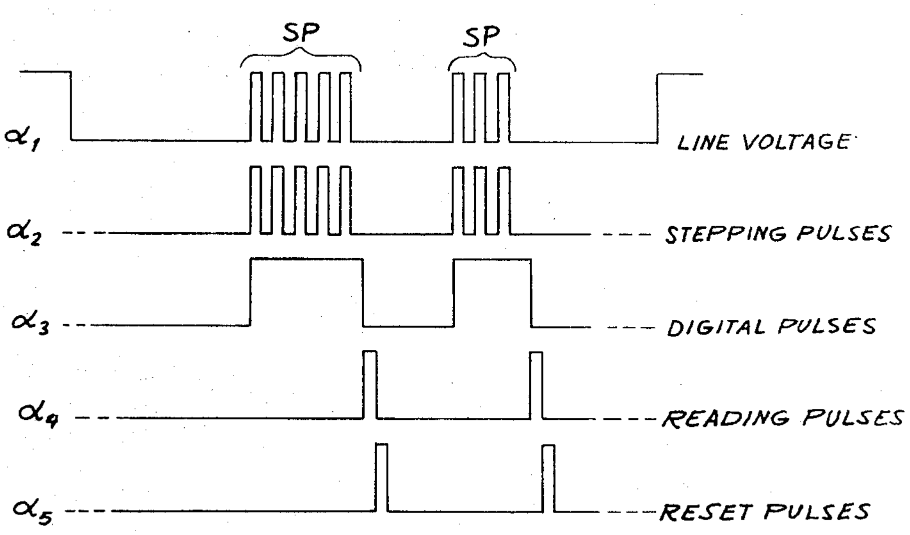
FIGS. 2 and 3 are sets of graphs serving to explain the operation of the system of FIG. 1.
Figure 3:
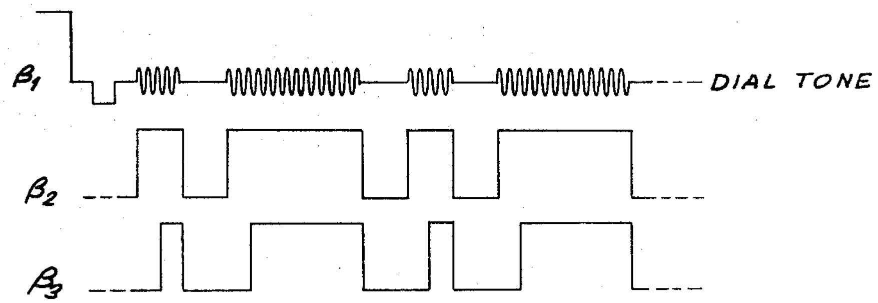

We shall now describe the operation of the system of FIG. 1 with reference to the graphs of FIGS. 2 and 3. In FIG. 2, graph $\alpha_1$ represents a replica of a line voltage as picked up on lead 33 by means of pulse generator RI, it being apparent that the potential of lead 33 is high when the line loop is open (transistor $tr_5$ cut off) and is low when it is closed (transistor $tr_5$ conducting). Dial pulses generated by operation of the selector 24 are reproduced on lead 33 as stepping pulses SP transmitted by amplifier $A_3$, with AND gate $N_1$ conductive in the set state of flip-flop $BS_3$, as a series of pulse trains $\alpha_2$ to identification circuit ID and counter input 11. Integrating network 38 converts each train of stepping pulses $\alpha_2$ into a digital pulse $\alpha_3$ which is differentiated by network 39 to yield a reading pulse $\alpha_4$ appearing on lead 41. Further differentiation in delay network $C_{14}$, $r_{17}$ and inversion at $I_8$ results in a reset pulse $\alpha_5$ applied to counter input 12.

The occurrence of a dial tone $\beta_1$, FIG. 3, in the input of amplifier A generates a square wave $\beta_2$ in the output of inverter $I_1$; when this square wave goes negative, i.e. returns to ground potential, the voltage of capacitor $C_8$ follows suit immediately so that inverter $I_2$ sets the flip-flop $BS_1$, whereas a positive pulse flank of wave $\beta_2$ results in a delayed charging of this capacitor to a level at which the flip-flop is reset. Thus, a square wave $\beta_3$ appearing in the set output of this flip-flop has leading edges offset from those of wave $\beta_2$ but trailing edges coinciding with those of wave $\beta_2$; this means that wave $\beta_3$ will not be generated by transients and will come into existence only if the oscillation $\beta_1$ persists for a certain period as determined by the operating parameters of this protective circuit.

If the user of the telephone at station AT observes the normal operating procedure, a lifting of the receiver to initiate a call terminates the positive signal $\alpha_1$ and discharges the previously charged capacitor $C_{10}$, thereby generating in the output of the inverter $I_{11}$ a positive pulse which sets the flip-flops $BS_3$ and $BS_4$ while also resetting (via OR gate $O_4$) the flip-flop $BS_5$ if it has previously been set. Shortly thereafter, the dial tone $\beta_1$ appears on the line whereupon signal $\beta_3$ energizes the lead 45 and via OR gate $O_1$ resets (if necessary) the flip-flops $BS_2$ and $BS_6$ while also resetting the discriminating flip-flop $BS_4$ which remains in this condition, indicating that dialing had not been commenced before the arrival of the dial tone.

The time constant of circuit $C_{10}$, $r_{11}$ is sufficiently large to prevent the junction 35 from going positive, above the setting threshold of flip-flop $BS_3$, during dialing. With AND gate $N_2$ enabled by the presence of positive potential on lead 37, the first dial pulse clears that gate to set the flip-flip $BS_2$. This flip-flop now blocks the transmission of voice signals via microphone 25 to the line *a*, *b* so as to prevent a spurious reoperation of flip-flop $BS_1$ after the same has returned to normal upon termination of the dial tone.

With AND gate $N_1$ also enabled by the output of flip-flop $BS_3$ on lead 37, the stepping pulses $\alpha_2$ are passed onto lead 40 and thence to the working input of counter CD but not to the flip-flop $BS_5$ via OR gate $O_3$, AND gate $N_4$ being nonconductive because of the reset condition of flip-flop $BS_4$. The counter CD now advances and energizes one of its output leads 1–10; at the end of the first train of stepping pulses, the corresponding digital pulse $\alpha_3$ in the output of network 38 disappears and gives rise to a reading pulse $\alpha_4$ in the output of network 39, i.e. on lead 41.

Let us assume that the user has dialed a permitted call number, starting with a digit other than 0. The counter CD now stops on one of its leads 1–9 and does not energize the OR gate $O_2$. AND gate $N_3$ remains closed and the reading pulse $\alpha_4$ in the output of amplifier $A_{17}$ cannot reach the OR gate $O_3$ to set the flip-flop $BS_5$. Pulse $\alpha_4$ is, however, transmitted via lead 44 to the setting input of flip-flop $BS_6$ which thereupon blocks the counter at input 13, inhibiting any further stepping thereof. Shortly thereafter, a reset pulse $\alpha_5$ appears in the output of inverter $I_8$ to restore the counter to zero at its input 12.

Further dialing then proceeds in the normal manner. Upon its completion, the appearance of ringing current (or a busy signal) on the line is detected by circuit RT and results in re-energization of lead 45 with consequent resetting of flip-flops $BS_2$ and $BS_6$. Flip-flop $BS_2$ removes the short circuit from microphone 25 so that the call can be consummated.

Suppose, on the other hand, that the first digit had been 0 with consequent energization of courter output 10. In such a case the positive voltage on lead 42 would have passed the OR gate $O_2$ and, via amplifier $A_{16}$, would have enabled the AND gate $N_3$ to clear the reading pulse $\alpha_4$. This would have tripped the flip-flop $BS_5$ and would have turned on the busy-signal generator GT as well as the transistor $tr_1$ in circuit 31. The resulting shunting effect would have attenuated the dial pulses to a degree making them incapable of performing any switching operation at the central office.

It is also conceivable that a user, in an effort to beat the system, starts dialing at the very instant when the dial tone would normally be received, i.e. before the flip-flop $BS_6$ is restored to its nonblocking condition. In this event, flip-flop $BS_4$ is not reset before the generation of the first dial pulse whereby AND gate $N_4$ is opened to the stepping pulses $\alpha_2$ coming over the lead 40 and amplifier $A_{14}$. The first of these stepping pulses now traverses the OR gate $O_3$ and switches the flip-flop $BS_5$ with energization of its output lead 47 in the same manner as before, actuating the tone generator GT and effectively shunting the dial 24. If the dial tone had been present for only a very short period, the protective circuit $d_2$, $r_3$, $C_8$ in detector RT would have prevented the discriminator $BS_4$ from responding to it so that the sequence of operations would have been the same as that just described.

When the user restores his receiver after a consummated or abortive call, junction 35 goes positive after a predetermined period and resets the flip-flop $BS_3$. This operation, removing positive voltage from lead 37, generates a positive pulse on the output lead 46 of inverter $I_{13}$ to reset the flip-flops $BS_2$, $BS_5$ and $BS_6$ if they happen to be set at this time. The system has now been restored to normal.

Figure 4:
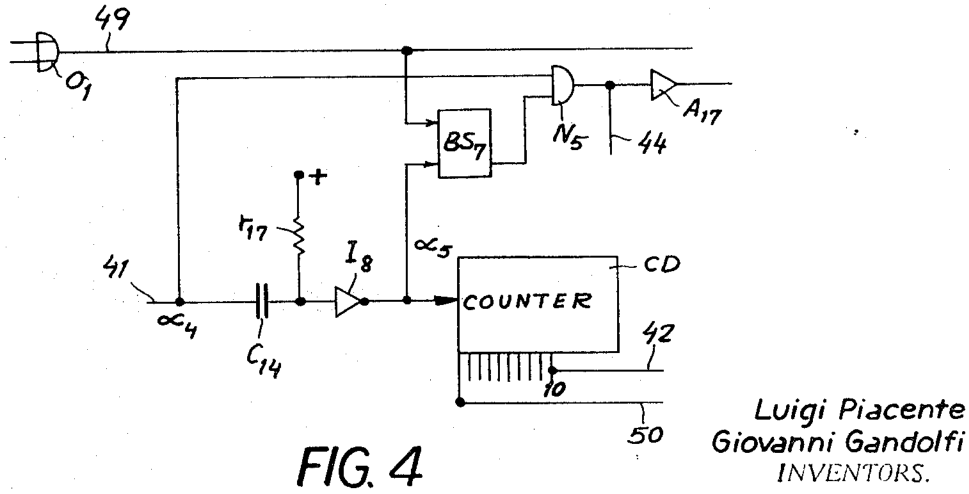
FIG. 4 is a fragmentary circuit diagram showing a modification.

Obviously, the arrangement shown in FIG. 1 could also be used to inhibit all outgoing calls from this station by strapping each of the outputs 1–10 of counter CD to a respective input 14–23 of OR gate $O_2$.

in FIG. 4 we have shown how the principles described above may be utilized in a telecommunication system in which not the first but a subsequent digit, here specifically the second, is critical for determining whether a call is permitted to proceed. In this case, lead 41 is connected to amplifier $A_{17}$ and flip-flop input 44 not directly but through a further AND gate $N_5$ whose other input is tied to the set output of a flip-flop $BS_7$. This flip-flop is settable by the pulse $\alpha_5$ in the output of inverter $I_8$ and resettable by the output of OR gate $O_1$ on lead 49 in response to the appearance of the central-office signal or the restoration of the receiver. Thus, the aforedescribed switching operations controlled by the counter CD will take place only after the first reset pulse $\alpha_5$ has conditioned the AND gate $N_5$ to clear the second reading pulse $\alpha_4$.

In this instance, counter outputs 1 and 10 may be connected to respective inputs of OR gate $O_2$ (FIG. 1) via leads 42 and 50, thereby conditioning the call-blocking device for operation in response to the dialing of any area code currently used for long-distance calling in the United States.

We claim:

1. A device for blocking the initiation of certain outgoing calls, characterized by a predetermined value of a specified call-number digit, from a subscriber station of a telecommunication system connected via an outgoing line to a central office, comprising:

monitoring circuitry at said station connected across said line for detecting dial pulses generated at said station by a call selector periodically opening and closing a line loop;

pulse-shaping means in said circuitry for generating trains of stepping pulses in the rhythm of said dial pulses and for deriving an individual digital pulse from any such train;

an electronic pulse counter connected to said circuitry for receiving said stepping pulses therefrom, said counter having at least one output lead electrically marked in response to a predetermined number of consecutive stepping pulses;

control means connected to said pulse-shaping means for enabling said counter only in the presence of a predetermined digital pulse in a sequence of such digital pulses; and electronic switch means connected to said output lead for shunting said call selector, thereby preventing effective open-circuiting of said line loop and attenuating the dial pulses transmitted to said central office;

said circuitry further including a detector for alternating-current signals from said central office and discriminating means connected to said detector and pulse-shaping means for determining the presence of a dial tone from the central office prior to generation of the first stepping pulse and, upon the occurrence of a stepping pulse in the absence of such dial tone, for operating said switch means independently of said counter.

2. A device as defined in claim 1 wherein said station is equipped with an electro-accoustic transducer for transmitting voice signals over said line, further comprising disabling means for said transducer connected to said pulse-shaping means for preventing the transmission of such voice signals during dialing, said disabling means being controlled by said detector for reactivating said transducer in response to central-office signals.

3. A device as defined in claim 1, further comprising a protective circuit ahead of said detector for suppressing transients in the input thereof.

4. A device as defined in claim 1 wherein said circuitry further includes differentiation means responsive to the first digital pulse after initial closure of the line loop for generating a reading pulse at the end of said predetermined digital pulse, the connection between said output lead and said switch means including normally blocked gate means controlled by said differentiation means for unblocking by said reading pulse.

5. A device as defined in claim 4, further comprising blocking means for said counter connected to said differentiation means for actuation by said reading pulse and to said discriminating means for deactivation in the presence of a dial tone.

6. A device as defined in claim 4, further comprising delay means connected to said differentiation means and said counter for resetting the latter a predetermined period after the occurrence of said reading pulse.

7. A device as defined in claim 1, further comprising a continuously operative power supply for said circuitry, said power supply including a first network bridging said line for developing a voltage drop in the open-loop condition and a second network in series with the line for developing a voltage drop in the closed-loop condition.

8. A device as defined in claim 10 wherein said first network is provided with a d-c output terminal energizing said circuitry, said power supply further comprising a d-c/d-c converter connecting said second network to said terminal.

9. A device as defined in claim 1, further comprising a tone generator controlled by said switch means for placing a busy signal on said line concurrently with the shunting of said call selector.

10. A device for blocking the initiation of certain outgoing calls, characterized by a predetermined numerical value of a specified call-number digit, from a subscriber station of a telecommunication system connected via an outgoing line to a central office, comprising:

monitoring circuitry at said station connected across said line for detecting dial pulses generated at said station by a call selector periodically opening and closing a line loop;

pulse-shaping means in said circuitry for generating trains of stepping pulses in the rhythem of said dial pulses and for deriving an individual digital pulse from any such train;

an electronic pulse counter connected to said circuitry for receiving said stepping pulses therefrom, said counter having at least one output lead electrically marked in response to a predetermined number of consecutive stepping pulses;

control means connected to said pulse-shaping means for enabling said counter only in the presence of a predetermined digital pulse in a sequence of such digital pulses; and electronic switch means connected to said output lead for shunting said call selector, thereby preventing effective open-circuiting of said line loop and attenuating the dial pulses transmitted to said central office; and a continuously operative power supply for said circuitry, said power supply including a first network bridging said line for developing a voltage drop in the open-loop condition and a second network in series with the line for developing a voltage drop in the closed-loop condition.

* * * * *